US009444561B2

United States Patent
Devarasetty et al.

(10) Patent No.: US 9,444,561 B2
(45) Date of Patent: *Sep. 13, 2016

(54) METHODS, SYSTEMS AND COMPUTER READABLE MEDIA FOR SIMULATING PER USER EQUIPMENT (UE) DOPPLER SHIFTS FOR TESTING AIR INTERFACE DEVICES

(71) Applicant: Ixia, Calabasas, CA (US)

(72) Inventors: Prasada Rao Devarasetty, Cary, NC (US); Zhiyong Yan, Cary, NC (US)

(73) Assignee: IXIA, Calabasas, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/049,193

(22) Filed: Oct. 8, 2013

(65) Prior Publication Data

US 2015/0031310 A1      Jan. 29, 2015

Related U.S. Application Data

(60) Provisional application No. 61/859,771, filed on Jul. 29, 2013.

(51) Int. Cl.
*H04B 17/00* (2015.01)
*H04B 17/391* (2015.01)

(52) U.S. Cl.
CPC ...... *H04B 17/0085* (2013.01); *H04B 17/3912* (2015.01)

(58) Field of Classification Search
CPC ................. H04B 17/0085; H04B 17/3912
USPC ............................ 455/67.14, 67.12
See application file for complete search history.

(56) References Cited

U.S. PATENT DOCUMENTS

| 5,465,393 | A | * | 11/1995 | Frostrom | ............... H04W 24/06 333/109 |
| 8,050,338 | B2 | | 11/2011 | Wilhelmsson | |
| 2006/0122814 | A1 | * | 6/2006 | Beens | ................. G06F 15/7864 702/189 |
| 2006/0258320 | A1 | | 11/2006 | Huang | |
| 2009/0163212 | A1 | * | 6/2009 | Hall et al. | ..................... 455/438 |

(Continued)

FOREIGN PATENT DOCUMENTS

| JP | 2011-193124 A | 9/2011 |
| KR | 10-2000-0072934 A | 12/2000 |
| KR | 10-2008-0066321 A | 7/2008 |
| KR | 10-2011-0085274 A | 7/2011 |
| KR | 10-2011-0112502 A | 10/2011 |
| WO | WO 2015/065900 A1 | 5/2015 |

OTHER PUBLICATIONS

Non-Final Office Action for U.S. Appl. No. 14/069,215 (Apr. 29, 2015).

(Continued)

*Primary Examiner* — Wesley Kim
*Assistant Examiner* — Raj Chakraborty
(74) *Attorney, Agent, or Firm* — Jenkins, Wilson, Taylor & Hunt, P.A.

(57) ABSTRACT

The subject matter described herein includes methods, systems, and computer readable media for simulating per-UE Doppler shifts. One exemplary method includes generating uplink signals to be transmitted from a plurality of different simulated UEs to an air interface device under test. The method further includes applying per-UE Doppler shifts to the signals, wherein applying per-UE Doppler shifts includes applying different Doppler shifts to at least some of the signals. The method further includes transmitting the signals to the air interface device under test.

19 Claims, 4 Drawing Sheets

(56) References Cited

U.S. PATENT DOCUMENTS

| | | | |
|---|---|---|---|
| 2009/0268828 A1* | 10/2009 | Roberts | 375/260 |
| 2010/0075678 A1 | 3/2010 | Akman et al. | |
| 2011/0053516 A1 | 3/2011 | Harteneck | |
| 2011/0142115 A1 | 6/2011 | Wang et al. | |
| 2011/0270567 A1 | 11/2011 | Mow et al. | |
| 2012/0269278 A1* | 10/2012 | Onggosanusi | H04B 7/024 375/267 |
| 2013/0143503 A1 | 6/2013 | Li et al. | |
| 2013/0303089 A1* | 11/2013 | Wang et al. | 455/67.12 |
| 2015/0117225 A1 | 4/2015 | Devarasetty et al. | |

OTHER PUBLICATIONS

Notification of Transmittal of the International Search Report and the Written Opinion of the International Searching Authority, or the Declaration for International Application No. PCT/US2014/062399 (Jan. 20, 2015).

Sur et al, "Doppler Shift Impact on the MIMO OFDM System in Vehicular Channel Condition," I.J. Information Technology and Computer Science, vol. 8, pp. 57-62 (2012).

Zhong et al., "The MITRE Tactical Channel Emulation System," The MITRE Corporation, Case 13-1750 (May 2013).

Notification of Transmittal of the International Search Report and the Written Opinion of the International Searching Authority, or the Declaration for PCT International Application No. PCT/US2014/045647 (Nov. 5, 2014).

Final Office Action for U.S. Appl. No. 14/069,215 (Dec. 22, 2015).

Commonly-assigne, co-pending U.S. Appl. No. 15/134,338 for "Methods, Systems and Computer Readable Media for Simulating Per User Equipment (UE) Slow and Fast Signal Fading for Testing Air Interface Devices," (Unpublished, filed Apr. 20, 2016).

Notice of Allowance and Fee(s) Due for U.S. Appl. No. 14/069,215 (Apr. 29, 2016).

Communication of European publication number and information on the application of Article 67(3) EPC for European Application No. 14832004.7 (May 11, 2016).

* cited by examiner

METHODS, SYSTEMS AND COMPUTER READABLE MEDIA FOR SIMULATING PER USER EQUIPMENT (UE) DOPPLER SHIFTS FOR TESTING AIR INTERFACE DEVICES

PRIORITY CLAIM

This application claims the benefit of U.S. Provisional Patent Application Ser. No. 61/859,771, filed Jul. 29, 2013; the disclosure of which is incorporated herein by reference in its entirety.

TECHNICAL FIELD

The subject matter described herein relates to testing communications network equipment. More particularly relates to methods and systems for simulating per-UE Doppler shifts for testing air interface devices.

BACKGROUND

In mobile communications networks, fixed network equipment, such as evolved Node Bs (e-Node Bs) communicates with mobile UEs over the air interface. Because UEs move relative to the fixed network equipment, Doppler effects can cause frequency shifts in uplink signals transmitted from the UEs to the fixed network equipment. For example, if a UE is in a car moving towards or away from the e-Node B, Doppler shifts affect the frequency of the signals transmitted from the UE to the e-Node B and the reception of the signal from the e-Node B to the UE. Because multiple UEs may be present in an area served by an e-Node B, and the UEs may be moving at different speeds and directions, the Doppler effects on the signals to and from the UEs vary.

It is desirable to test the functionality and performance of air interface equipment in response to Doppler effects on signals to and from the UEs. However, conventional communications network test equipment is only capable of applying the same Doppler shift to a group of UEs. There is no ability to apply Doppler shifts on a per-UE basis. Thus, the test environment does not accurately reflect the real operating environment.

In light of these difficulties, there exists a need for methods, systems, and computer readable media for simulating per-UE Doppler shifts for testing air interface devices.

SUMMARY

The subject matter described herein includes methods, systems, and computer readable media for simulating per-UE Doppler shifts. One exemplary method includes generating uplink signals to be transmitted from a plurality of different simulated UEs to an air interface device under test. The method further includes applying per-UE Doppler shifts to the signals, wherein applying per-UE Doppler shifts includes applying different Doppler shifts to at least some of the signals. The method further includes transmitting the signals to the air interface device under test.

The subject matter described herein for simulating per-UE Doppler shifts for testing air interface devices may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
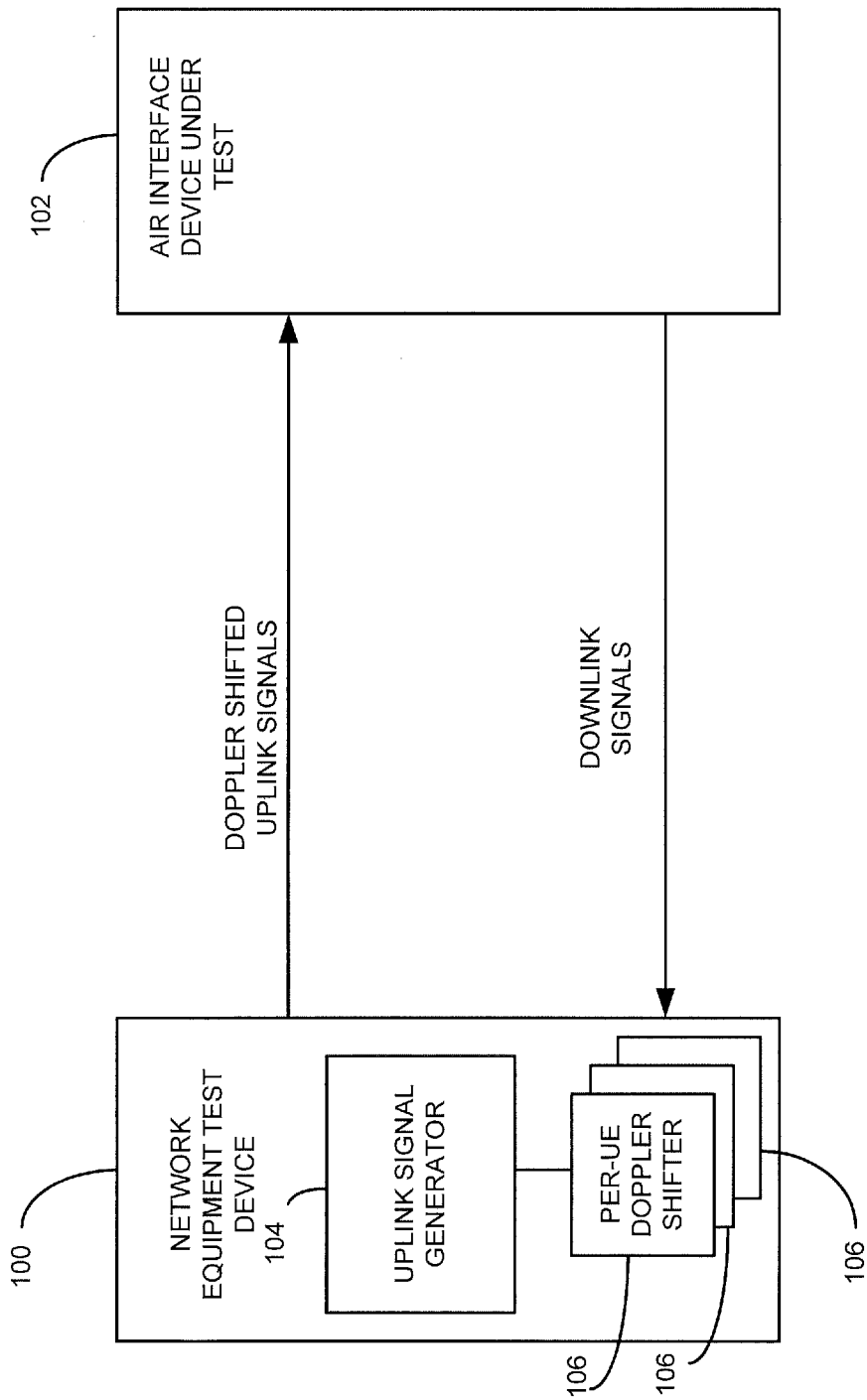
FIG. 1 is a block diagram illustrating an exemplary test environment for using per-UE Doppler shifts to test an air interface device according to an embodiment of the subject matter described herein.

The subject matter described herein includes methods, systems, and computer readable media for applying per-UE Doppler shifts to uplink signals to test an air interface device. FIG. 1 is a block diagram illustrating an exemplary test environment for applying per-UE Doppler shifts to test an air device according to an embodiment of the subject matter described herein. Referring to FIG. 1, a network equipment test device 100 transmits signals to a device under test 102 to test the functionality and performance of the device under test. Device under test 102 may be a stationary air interface device, such as a Node B or an e-Node B.

Network equipment test device 100 may be a multi-UE simulator that simultaneously simulates multiple UEs, such as long term evolution (LTE) or LTE advanced UEs. In the illustrated example, network equipment test device 100 includes an uplink signal generator 104 for generating uplink signals from simulated UEs to be transmitted to device under test 102. Uplink signal generator 104 may generate LTE, LTE advanced, and other uplink signals to test the functionality and performance of device under test 102. Uplink signal generator 104 may generate reference signals, control signals and data signals to simulated uplink transmissions by UEs.

Network equipment test device 100 further includes a plurality of per-UE Doppler shifters 106 for applying Doppler shifts to uplink signals on a per-UE basis. Because Doppler shifts are applied on a per-UE basis, different Doppler shifts can be applied to signals from different UEs. As a result, the test environment generated by network equipment test device 100 more accurately simulates a real network environment where Doppler shifts vary.

Figure 2:
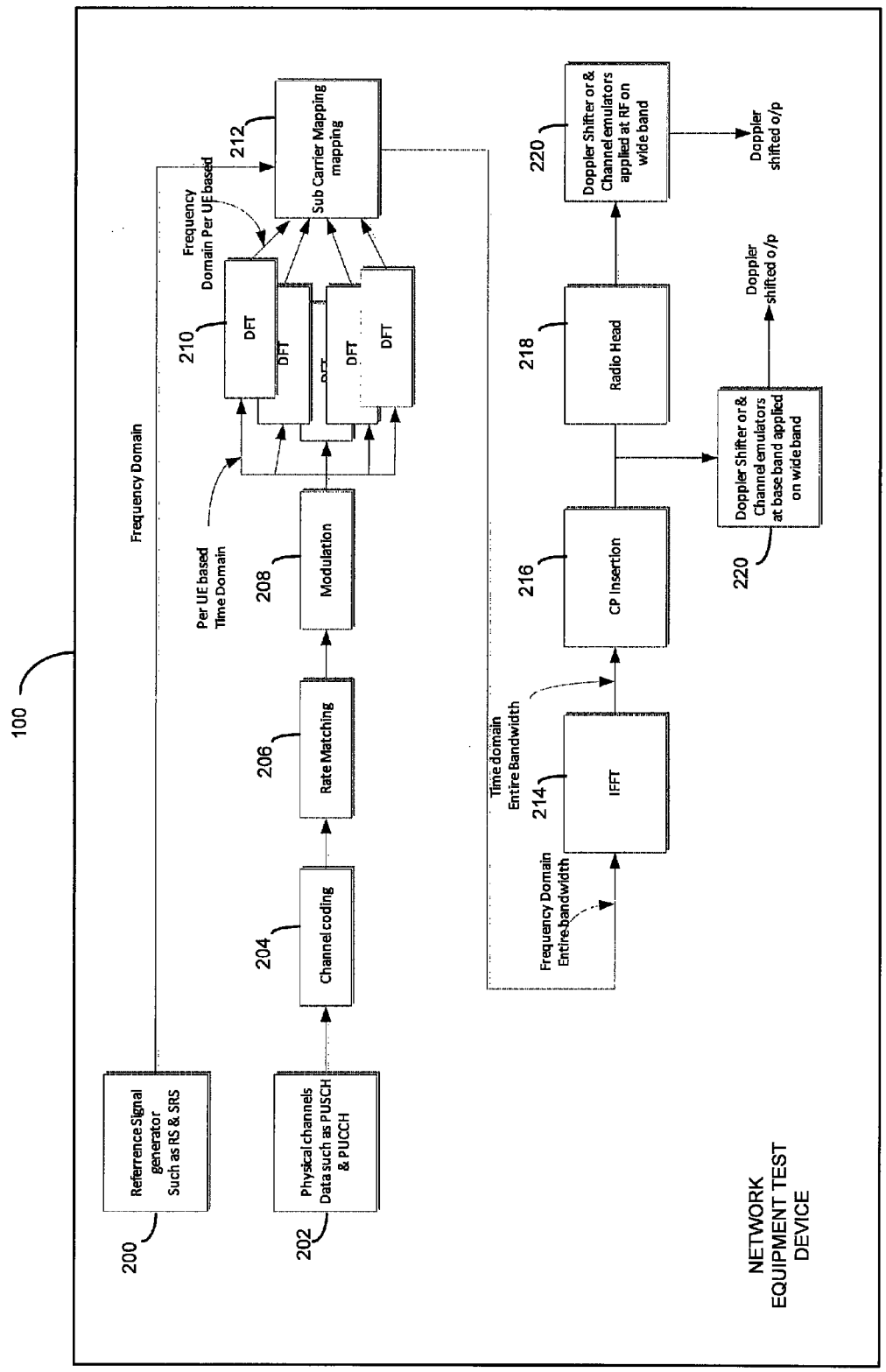
FIG. 2 is a block diagram illustrating a conventional uplink signal chain for applying the same Doppler shift to all uplink signals.

FIG. 2 is a block diagram of an uplink signal chain architecture implemented by a conventional network equipment test device where the same Doppler shift is applied to the combined uplink signal from all UEs. Referring to FIG. 2, the uplink signal chain architecture includes a reference signal generator 200 for generating simulated UE reference signals and a physical channel generator 202 for generating physical uplink channels, such as the LTE physical uplink shared channel (PUSCH) and physical uplink control channel (PUCCH). The physical channels undergo channel coding 204, rate matching 206, modulation 208, and discrete Fourier transform (DFT) processing 210 before the physical channels along with the reference signals undergo subcarrier mapping 212, which maps the physical channels to uplink resource blocks.

After subcarrier mapping, the entire uplink signal is in the frequency domain. However, the signal must be converted to the time domain before being transmitted over the air interface. Accordingly, the signal undergoes inverse fast Fourier transform 214 and cyclic prefix (CP) insertion 216 before the signal is provided to radio head 218 and then either transmitted wirelessly over the air interface to a device under test or over a simulated air interface using cables to the device under test.

In conventional multi-UE simulators, the Doppler shift was applied either after CP insertion 216 or after processing by radio head 218. Such Doppler shift was applied to the entire signal such that all UEs were shifted the same. These two conventional methods for Doppler shifting are represented in FIG. 2 by Doppler shifters 220. Applying the same Doppler shift to the entire signal does not accurately simulate real world conditions. In addition, a wideband Doppler shifter is an expensive piece of equipment, which increases the cost of network test equipment.

Figure 3:
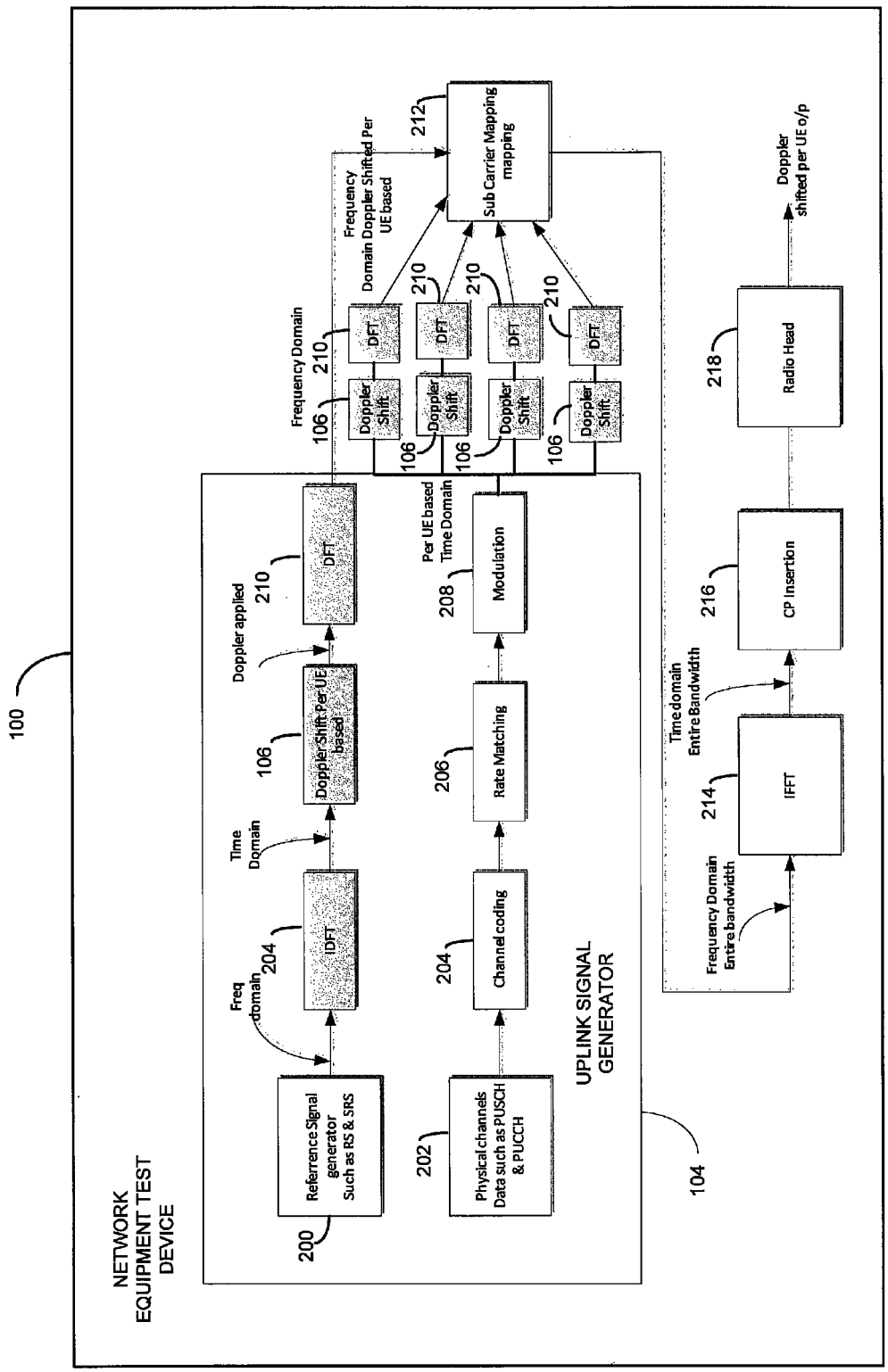
FIG. 3 is a block diagram illustrating an exemplary uplink signal chain architecture for applying per-UE Doppler shifts to uplink signals according to an embodiment of the subject matter described herein.

In order to avoid the shortcomings of wideband Doppler shifting, the subject matter described herein includes per-UE Doppler shifting of uplink signals. FIG. 3 is a block diagram of an exemplary system for per-UE Doppler shifting according to an embodiment of the subject matter described herein. Referring to FIG. 3, the correspondingly numbered blocks in the uplink signal chain perform the same functions as those described with respect to FIG. 2. Accordingly, a description thereof will not be repeated herein. However, rather than applying Doppler shifts on a wideband basis, in the embodiment illustrated in FIG. 3, per-UE Doppler shifters 106 apply per-UE Doppler shift to the uplink signal for each UE. The per-UE Doppler shifters 106 apply Doppler shifts to the time domain uplink signals prior to discrete Fourier transform and subcarrier mapping. In addition, per-UE Doppler shifts are also applied to the reference signal for each UE. Because Doppler shifts are applied on a per-UE basis, different Doppler shifts can be applied to signals from different UEs. For example, a signal for one UE may be Doppler shifted to indicate that the UE is traveling towards the device under test at a certain rate of speed. A Doppler shift for another UE may be applied to simulate the UE traveling away from the device under test at a certain speed. Applying per-UE Doppler shifts can be performed in software or hardware in the uplink signal chain of network equipment test device 100 without requiring a conventional wideband Doppler shifter.

An uplink signal for a single UE can be represented in the time domain by:

$$A\cos(2\pi ft), \quad (1)$$

where A is the amplitude and f is the frequency of the uplink signal. Applying a per-UE Doppler shift may be accomplished by changing the frequency of the uplink signal according to one of the Doppler shift equations, depending on whether the UE is being simulated as moving towards or away from the device under test. If the UE is being simulated as moving towards the device under test, the new frequency of the uplink signal for that UE may be calculated as follows:

$$f'=(v/(v-v_s))*f, \quad (2)$$

where v is the velocity of light in air, $v_s$ is the velocity of the moving source (the UE being simulated), and f is the original frequency of the uplink signal. Thus, the time domain equation for the Doppler shifted source signal becomes:

$$A\cos(2\pi f't), \quad (3)$$

where f' is the Doppler shifted frequency for the uplink signal. To simulate different frequencies for different UEs, per-UE Doppler shifters 106 may use different values of $v_s$ to simulate different UE velocities when moving towards the device under test. Similarly, to simulate per-UE Doppler shifts when the UE is moving away from the device under test, per-UE Doppler shifters 106 may utilize the following equation to compute the Doppler shifted frequency of the uplink signal:

$$f'=v/(v+v_s), \quad (4)$$

where v is the speed of light in air, $v_s$ is the velocity of the moving source (the UE being simulated), and f is the original frequency of the uplink signal. Thus, by using equations 2-4, and varying the value of $v_s$, per-UE Doppler shifters 106 may simulate per-UE Doppler shifts with different amounts and directions of frequency shift for different UEs.

Figure 4:
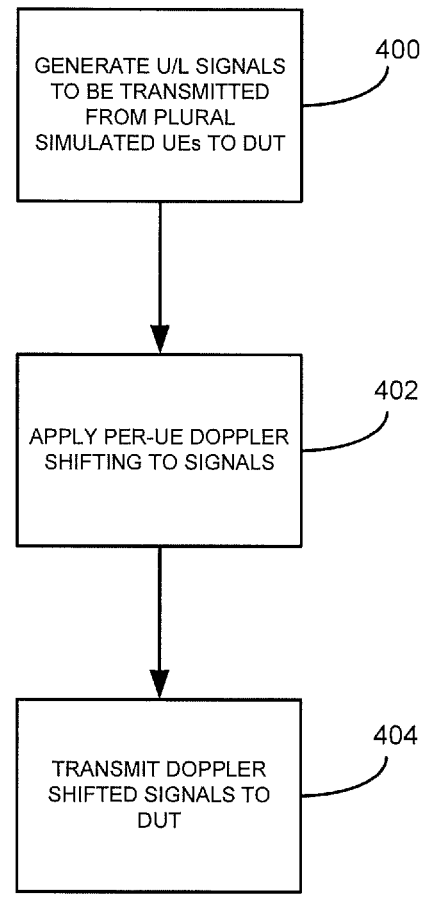
FIG. 4 is a flow chart illustrating an exemplary process for testing an air interface device by applying per-UE Doppler shifts to uplink signals according to an embodiment of the subject matter described herein.

FIG. 4 is a flow chart illustrating exemplary steps for testing an air interface device using per-UE Doppler shifts of uplink signals according to an embodiment of the subject matter described herein. Referring to FIG. 4, in step 400, uplink signals to be transmitted from plural simulated UEs to an air interface device under test are generated. For example, network equipment test device 100 may generate physical channels and reference signals for multiple UEs. In step 402, per-UE Doppler shifts are applied to the signals so that at least some of the signals have different Doppler shifts. For example, per-UE Doppler shifters 106 may apply different Doppler shifts to at least some of the simulated UE uplink signals using Equations 2-4 above. In step 404, the signals are transmitted to the device under test. For example, network equipment test device 100 transmits the Doppler-shifted signals to the device under test over a wired or wireless interface, depending on the test configuration.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing an air interface device using per user equipment (UE) Doppler shifted signals, the method comprising:
   at a network equipment test device:
   generating uplink signals including per-UE time domain uplink signals to be transmitted from plural simulated UEs to an air interface device under test;

applying per-UE Doppler shifts to the per-UE time domain uplink signals, wherein applying per-UE Doppler shifts to the per-UE time domain uplink signals includes applying different Doppler shifts to at least some of the per-UE time domain uplink signals, wherein applying per-UE Doppler shifts includes utilizing a plurality of per UE Doppler in the network equipment test device that apply Doppler shifts to the per-UE time domain uplink signals performing discrete Fourier transformation and subcarrier mapping of the per-UE time domain, Doppler shifted uplink signals to produce a frequency domain entire bandwidth uplink signal;

performing inverse fast Fourier transformation of the frequency domain entire bandwidth uplink signal to produce a time domain entire bandwidth uplink signal; and transmitting the time domain entire bandwidth uplink signal to the air interface device under test.

2. The method of claim 1 wherein generating uplink signals includes generating long term evolution (LTE) or LTE advanced uplink signals.

3. The method of claim 1 wherein generating uplink signals includes generating uplink reference signals, control channel signals, and data channel signals.

4. The method of claim 3 comprising applying Doppler shifts to the reference signals on a per-UE basis.

5. The method of claim 1 wherein applying the per-UE Doppler shifts to the per-UE time domain uplink signals includes simulating a Doppler shift for a UE moving towards a stationary device under test.

6. The method of claim 1 wherein applying the per-UE Doppler shifts to the per-UE time domain uplink signals in the time domain includes simulating a Doppler shift for a UE moving away from a stationary device under test.

7. The method of claim 1 wherein applying different Doppler shifts to at least some of the per-UE time domain uplink signals includes applying Doppler shifts that simulate UEs traveling at different velocities with respect to the air interface device under test.

8. The method of claim 1 wherein applying different Doppler shifts to at least some of the per-UE time domain uplink signals includes applying Doppler shifts that simulate UEs traveling in different directions with respect to the air interface device under test.

9. The method of claim 1 wherein the air interface device under test comprises an evolved Node B (e-Node B).

10. A system for testing an air interface device using per user equipment (UE) Doppler shifted signals, the system comprising:

a network equipment test device:

an uplink signal generator for generating uplink signals including per-UE time domain uplink signals to be transmitted from plural simulated UEs to an air interface device under test;

a plurality of per-UE Doppler shifters for applying per-UE Doppler shifts to the per-UE time domain uplink signals, wherein applying per-UE Doppler shifts includes applying different Doppler shifts to at least some of the per-UE time domain uplink signals, wherein applying per-UE Doppler shifts includes utilizing a plurality of per UE Doppler in the network equipment test device that apply Doppler shifts to the per-UE time domain uplink signals;

a plurality of discrete Fourier transformation units and a subcarrier mapping unit for respectively performing discrete Fourier transformation and subcarrier mapping of the per-UE time domain, Doppler shifted uplink signals to produce a frequency domain entire bandwidth uplink signal;

an inverse fast Fourier transformation (IFFT) unit for performing inverse fast Fourier transformation of the frequency domain entire bandwidth uplink signal to produce a time domain entire bandwidth uplink signal; and a network interface for transmitting the time domain entire bandwidth uplink signal to the air interface device under test.

11. The system of claim 10 wherein the uplink signal generator is configured to generate long term evolution (LTE) or LTE advanced uplink signals.

12. The system of claim 10 wherein the uplink signal generator is configured to generate uplink reference signals, control channel signals, and data channel signals.

13. The system of claim 10 wherein the per-UE Doppler shifters are configured to apply Doppler shifts to the reference signals on a per-UE basis.

14. The system of claim 10 wherein the per-UE Doppler shifters are configured to apply the per-UE Doppler shifts to simulate a Doppler shift for a UE moving towards a stationary device under test.

15. The system of claim 10 wherein the per-UE Doppler shifters are configured to apply the per-UE Doppler shifts to simulate a Doppler shift for a UE moving away from a stationary device under test.

16. The system of claim 10 wherein the per-UE Doppler shifters are configured to apply Doppler shifts that simulate UEs traveling at different speeds with respect to the air interface device under test.

17. The system of claim 10 wherein the per-UE Doppler shifters are configured to apply Doppler shifts that simulate UEs traveling in different directions with respect to the air interface device under test.

18. The system of claim 10 wherein the air interface device under test comprises an evolved Node B (e-Node B).

19. A non-transitory computer readable medium having stored thereon executable instructions that when executed by the processor of a computer control the computer to perform steps comprising:

at a network equipment test device:

generating uplink signals including per user equipment (per-UE) time domain uplink signals to be transmitted from plural simulated UEs to an air interface device under test;

applying per-UE Doppler shifts to the per-UE time domain uplink signals, wherein applying per-UE Doppler shifts includes applying different Doppler shifts to at least some of the per-UE time domain uplink signals, wherein applying per-UE Doppler shifts includes utilizing a plurality of per UE Doppler in the network equipment test device that apply Doppler shifts to the per-UE time domain uplink signals;

performing discrete Fourier transformation and subcarrier mapping of the per-UE time domain, Doppler shifted uplink signals to produce a frequency domain entire bandwidth uplink signal;

performing inverse fast Fourier transformation of the frequency domain entire bandwidth uplink signal to produce a time domain entire bandwidth uplink signal; and transmitting the time domain entire bandwidth uplink signal to the air interface device under test.

\* \* \* \* \*